United States Patent
Baird

(10) Patent No.: US 8,121,277 B2
(45) Date of Patent: Feb. 21, 2012

(54) CATCH-UP PLAYBACK IN A CONFERENCING SYSTEM

(75) Inventor: Randall B. Baird, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 1396 days.

(21) Appl. No.: 11/638,636

(22) Filed: Dec. 12, 2006

(65) Prior Publication Data

US 2008/0137558 A1  Jun. 12, 2008

(51) Int. Cl.
 *H04M 3/56* (2006.01)
 *H04L 12/18* (2006.01)
(52) U.S. Cl. .................................. 379/202.01; 370/260
(58) Field of Classification Search .................. 370/260; 379/202.01–206.01
 See application file for complete search history.

(56) References Cited

U.S. PATENT DOCUMENTS

| | | | |
|---|---|---|---|
| 5,483,587 A | 1/1996 | Hogan et al. |
| 5,600,366 A | 2/1997 | Schulman |
| 5,673,253 A | 9/1997 | Shaffer |
| 5,729,687 A | 3/1998 | Rothrock et al. |
| 5,917,830 A | 6/1999 | Chen et al. |
| 5,963,217 A | 10/1999 | Grayson et al. |
| 6,044,081 A | 3/2000 | Bell et al. |
| 6,137,834 A | 10/2000 | Wine et al. |
| 6,141,324 A | 10/2000 | Abbott et al. |
| 6,236,854 B1 | 5/2001 | Bradshaw |
| 6,269,107 B1 | 7/2001 | Jong |
| 6,332,153 B1 | 12/2001 | Cohen |
| 6,501,739 B1 | 12/2002 | Cohen |
| 6,505,169 B1 | 1/2003 | Bhagavath et al. |
| 6,570,926 B1 | 5/2003 | Agrawal et al. |
| 6,608,820 B1 | 8/2003 | Bradshaw |
| 6,624,841 B1 | 9/2003 | Buchner |
| 6,643,298 B1 | 11/2003 | Brunheroto et al. |
| 6,643,496 B1 | 11/2003 | Shimoyama et al. |
| 6,650,652 B1 | 11/2003 | Valencia |
| 6,671,262 B1 | 12/2003 | Kung et al. |
| 6,675,216 B1 | 1/2004 | Quatrano et al. |
| 6,718,553 B2 | 4/2004 | Kenworthy |
| 6,735,572 B2 | 5/2004 | Landesmann |
| 6,744,785 B2 | 6/2004 | Robinett et al. |
| 6,771,644 B1 | 8/2004 | Brassil et al. |
| 6,771,657 B1 | 8/2004 | Elstermann |
| 6,775,247 B1 | 8/2004 | Shaffer et al. |

(Continued)

FOREIGN PATENT DOCUMENTS

EP  1 553 735 A1  7/2005

*Primary Examiner* — Harry Hong
(74) *Attorney, Agent, or Firm* — Baker Botts L.L.P.

(57) ABSTRACT

In one embodiment, a method includes receiving input indicating that an endpoint is dropping out of a real-time mode of attending an on-going conference session. A comment/question received from the endpoint is recorded along with a portion of the on-going conference session beginning at a time point when the endpoint dropped out of the real-time mode, The portion of the on-going conference session is then played back to the endpoint. At the point where the playback of the portion recorded catches up with the on-going conference session, the first endpoint is returned to the real-time mode of attending the on-going conference session. It is emphasized that this abstract is provided to comply with the rules requiring an abstract that will allow a searcher or other reader to quickly ascertain the subject matter of the technical disclosure.

26 Claims, 8 Drawing Sheets

U.S. PATENT DOCUMENTS

| | | |
|---|---|---|
| 6,816,469 B1 | 11/2004 | Kung et al. |
| 6,865,540 B1 | 3/2005 | Faber et al. |
| 6,876,734 B1 | 4/2005 | Summers et al. |
| 6,925,068 B1 | 8/2005 | Stanwood et al. |
| 6,931,001 B2 | 8/2005 | Deng |
| 6,931,113 B2 | 8/2005 | Ortel |
| 6,937,569 B1 | 8/2005 | Sarkar et al. |
| 6,947,417 B2 | 9/2005 | Laursen et al. |
| 6,956,600 B1 | 10/2005 | Gaylord |
| 6,956,828 B2 | 10/2005 | Simard et al. |
| 6,959,075 B2 | 10/2005 | Cutaia et al. |
| 6,976,055 B1 | 12/2005 | Shaffer et al. |
| 6,989,856 B2 | 1/2006 | Firestone et al. |
| 7,003,086 B1 | 2/2006 | Shaffer et al. |
| 7,007,098 B1 | 2/2006 | Smyth et al. |
| 7,031,348 B1 | 4/2006 | Gazit |
| 7,084,898 B1 | 8/2006 | Firestone et al. |
| 7,127,487 B1 | 10/2006 | Wang et al. |
| 7,209,763 B2 | 4/2007 | Martin et al. |
| 7,379,653 B2 | 5/2008 | Yap et al. |
| 7,660,849 B1 | 2/2010 | Shaffer et al. |
| 2001/0000540 A1 | 4/2001 | Cooper et al. |
| 2002/0004841 A1 | 1/2002 | Sawatari |
| 2002/0006165 A1 | 1/2002 | Kato |
| 2002/0052214 A1 | 5/2002 | Maggenti et al. |
| 2002/0087976 A1 | 7/2002 | Kaplan et al. |
| 2002/0163918 A1 | 11/2002 | Cline |
| 2003/0016632 A1 | 1/2003 | Refai et al. |
| 2003/0025786 A1 | 2/2003 | Norsworthy |
| 2003/0076850 A1 | 4/2003 | Jason, Jr. |
| 2003/0198195 A1 | 10/2003 | Li |
| 2004/0057449 A1 | 3/2004 | Black |
| 2004/0165527 A1 | 8/2004 | Gu et al. |
| 2004/0165710 A1 | 8/2004 | DelHoyo et al. |
| 2004/0184586 A1 * | 9/2004 | Coles et al. .............. 379/88.14 |
| 2004/0199659 A1 | 10/2004 | Ishikawa et al. |
| 2004/0213152 A1 | 10/2004 | Matuoka et al. |
| 2004/0250201 A1 | 12/2004 | Caspi |
| 2004/0255328 A1 | 12/2004 | Baldwin et al. |
| 2005/0069102 A1 | 3/2005 | Chang |
| 2005/0078171 A1 | 4/2005 | Firestone et al. |
| 2005/0081244 A1 | 4/2005 | Barrett et al. |
| 2005/0138372 A1 | 6/2005 | Kajihara et al. |
| 2005/0259803 A1 | 11/2005 | Khartabil |
| 2006/0020995 A1 | 1/2006 | Opie et al. |
| 2006/0067250 A1 | 3/2006 | Boyer et al. |
| 2006/0072672 A1 | 4/2006 | Holcomb et al. |
| 2006/0090166 A1 | 4/2006 | Dhara et al. |
| 2006/0104458 A1 | 5/2006 | Kenoyer |
| 2006/0146734 A1 | 7/2006 | Wenger et al. |
| 2006/0189337 A1 | 8/2006 | Farrill et al. |
| 2006/0259755 A1 | 11/2006 | Kenoyer |
| 2007/0110029 A1 | 5/2007 | Gilmore et al. |
| 2007/0123284 A1 | 5/2007 | Schliwa-Bertling et al. |
| 2007/0133435 A1 | 6/2007 | Eneroth et al. |
| 2008/0043140 A1 | 2/2008 | Herpel et al. |

* cited by examiner ns hown in FIG. 1.

CATCH-UP PLAYBACK IN A CONFERENCING SYSTEM

TECHNICAL FIELD

The present invention relates generally to the fields of telephony and conferencing systems.

BACKGROUND

A participant to a conference held over a network may be interrupted, i.e., pulled out of real-time listening or participation, for a variety of reasons. For example, the participant may need to step away from the conference to answer another call, or briefly discuss a matter of immediate urgency with a co-worker. Alternatively, the participant may invoke some feature of the conference service that results in the conference audio being interrupted, such as playing out the roster, receiving whisper information, moving to a sidebar conversation, etc. Upon returning to the live conference the participant usually wants to listen to what transpired in the conference during the time he was gone. Simply listening to a recording of the missed portions of the conference, however, is inadequate insomuch as the participant is permanently shifted away from real-time participation.

A number of prior art conferencing systems include a feature that allows portions of a conference session to be recorded and then played back at an accelerated rate, in what is commonly referred to as "catch-up" mode. The problem with these systems is that the participant frequently forgets that he is listening to the conference in catch-up mode, and attempts to speak as a participant in the conference. Comments made during catch-up mode, however, cannot be mixed into the real-time ("live") conference because the live conference has already progressed beyond the point in time of the catch-up mode playback.

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

DESCRIPTION OF EXAMPLE EMBODIMENTS

In the following description specific details are set forth, such as device types, system configurations, protocols, methods, etc., in order to provide a thorough understanding of the present invention. However, persons having ordinary skill in the relevant arts will appreciate that these specific details may not be needed to practice the present invention.

Figure 1:
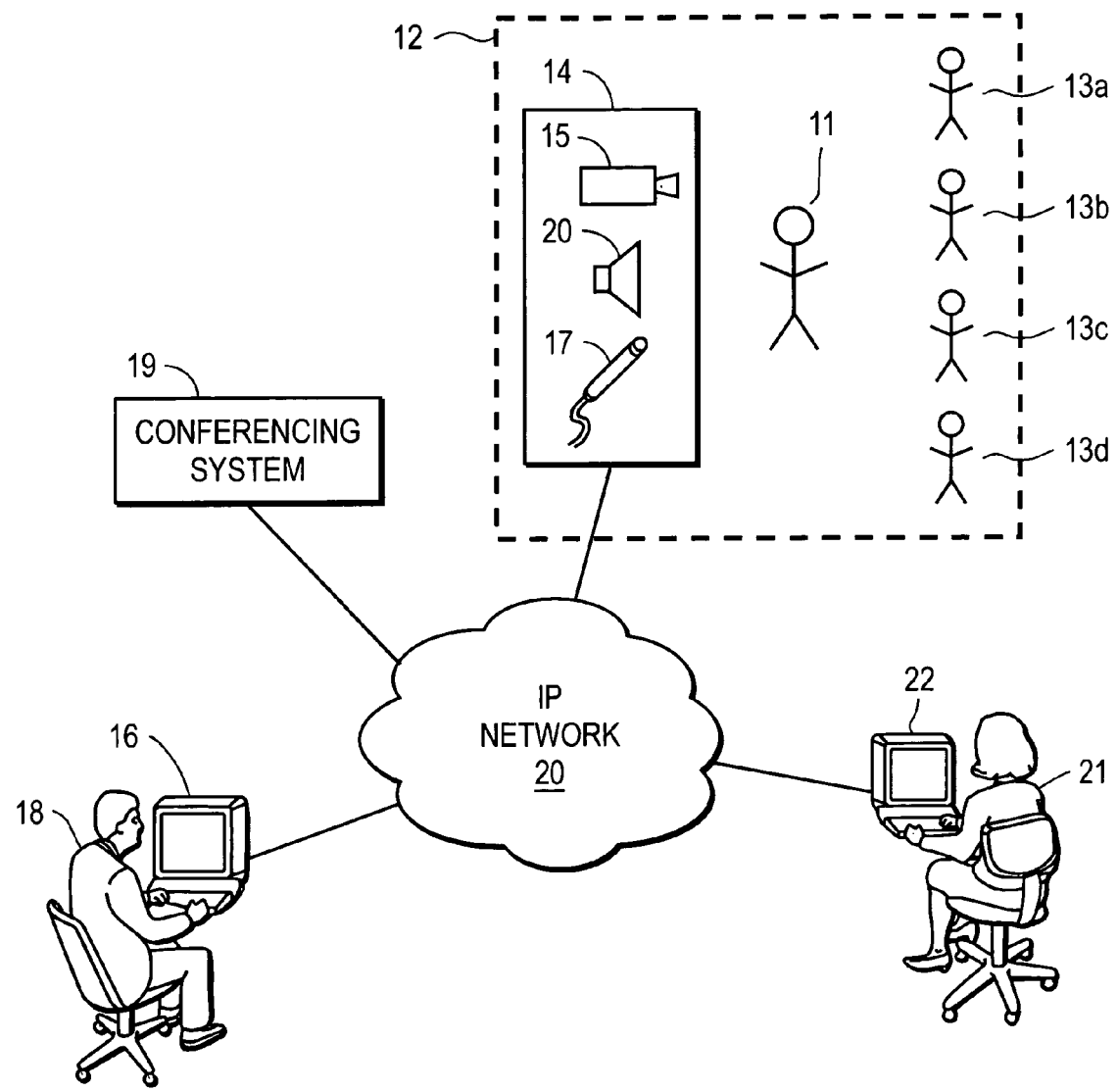
FIG. 1 illustrates an example conference held over a network.

FIG. 1 illustrates an example illustrates an example conference held over a network. This lecture-hall type of conference (also known as a moderated or floor-controlled conference) is managed and handled by a conferencing system 19 (e.g., a server) coupled via an Internet protocol (IP) network 20 to the various meeting participant endpoint devices. In this example, communications between remote participants and the participants in lecture hall 12 are facilitated by video conference endpoint device 14, which is shown including a loudspeaker 20, microphone 17 and video camera 15. (It is appreciated that multiple microphones and cameras may be used.) Remote participants 18 and 22 are shown attending the conference via respective endpoint devices 16 and 22, each of which comprises a personal computer (PC) with built-in softphone capabilities and video conference endpoint device 14, which is shown including a microphone 17 and video camera 15. Using PCs 16 and 22, respective participants 18 and 21 may each communicate with the other conference participants (i.e., members of the audience 13A-D) and moderator/lecturer 11. Although not explicitly shown in this example, endpoint device 14 may include a video display and PCs 16 & 22 may include a camera for transmitting images of participants 18 and 21 to the participants in lecture hall 12.

In the context of the present application, endpoint devices represent an end user, client, or person who wishes to initiate or participate in a conference session and via conferencing system 19 via IP network 20. Other endpoint devices not specifically shown in FIG. 1 that may be used to initiate or participate in a conference session include a personal digital assistant (PDA), a laptop or notebook computer, an IP telephone device, a non-IP telephone device, an audio/video appliance, a streaming client, a television device, programmable consumer electronics, or any other device, component, element, or object capable of initiating or participating in voice exchanges with conferencing system 19.

In the example of FIG. 1, video conference data (e.g., audio and video data) is communicated to endpoint device 16 via IP network 20. However, it should be understood that in different specific implementations the media path for the conference participants may include audio/video transmissions, e.g., Real-Time Transport Protocol (RTP) packets sent across a variety of different networks (e.g., Internet, intranet, PSTN, etc.), protocols (e.g., IP, Asynchronous Transfer Mode (ATM), Point-to-Point Protocol (PPP)), with connections that span across multiple services, systems, and devices. Alternative embodiments of the present invention may be implemented in software or hardware (firmware) installed in an IP communication systems, PBX, telephony, telephone, and other telecommunications systems. Similarly, the signaling path utilized for transmission of commands, messages, and signals for establishing, moderating, managing and controlling the conference session may be across any network resources.

Conferencing system 19 comprises a server with a processor subsystem for running a conferencing program including software (or firmware) plug-ins, modules, or enhancements that implement the various features and functions described herein. In a specific implementation, for example, conferencing system 19 may run a modified or enhanced IP communication system software product such as Cisco's Meeting-Place™ conferencing application that allows users to schedule and attend meeting conferences. In the embodiment shown, conferencing system 19 may also include a digital signal processor (DSP) or firmware/software-based system that mixes and/or switches audio/video signals received at its input ports under the control of the server. The audio signals received at the conference server ports originate from each of the conference or meeting participant endpoints (e.g., endpoint devices 16, 22 and 14), and possibly from an interactive voice response (IVR) system (not shown). In certain embodiments, conference server may also incorporate or be associated with a natural language automatic speech recognition (ASR) module for interpreting and parsing speech of the participants, and standard speech-to-text (STT) and text-to-speech (TTS) converter modules.

Practitioners in the art will appreciate that the actual media paths are established by conferencing system 19. In other words, conferencing system 19 handles all of the control plane functions of the conference session, and is responsible for engaging the necessary media components/resources to satisfy the media requirements of each of the endpoints (i.e., endpoint 16) participating in a conference session. In operation, endpoint devices 14, 16 and 22 shown in FIG. 1 may join the audio/video conference session by calling into a conferencing application running on the conferencing server.

Figure 2:
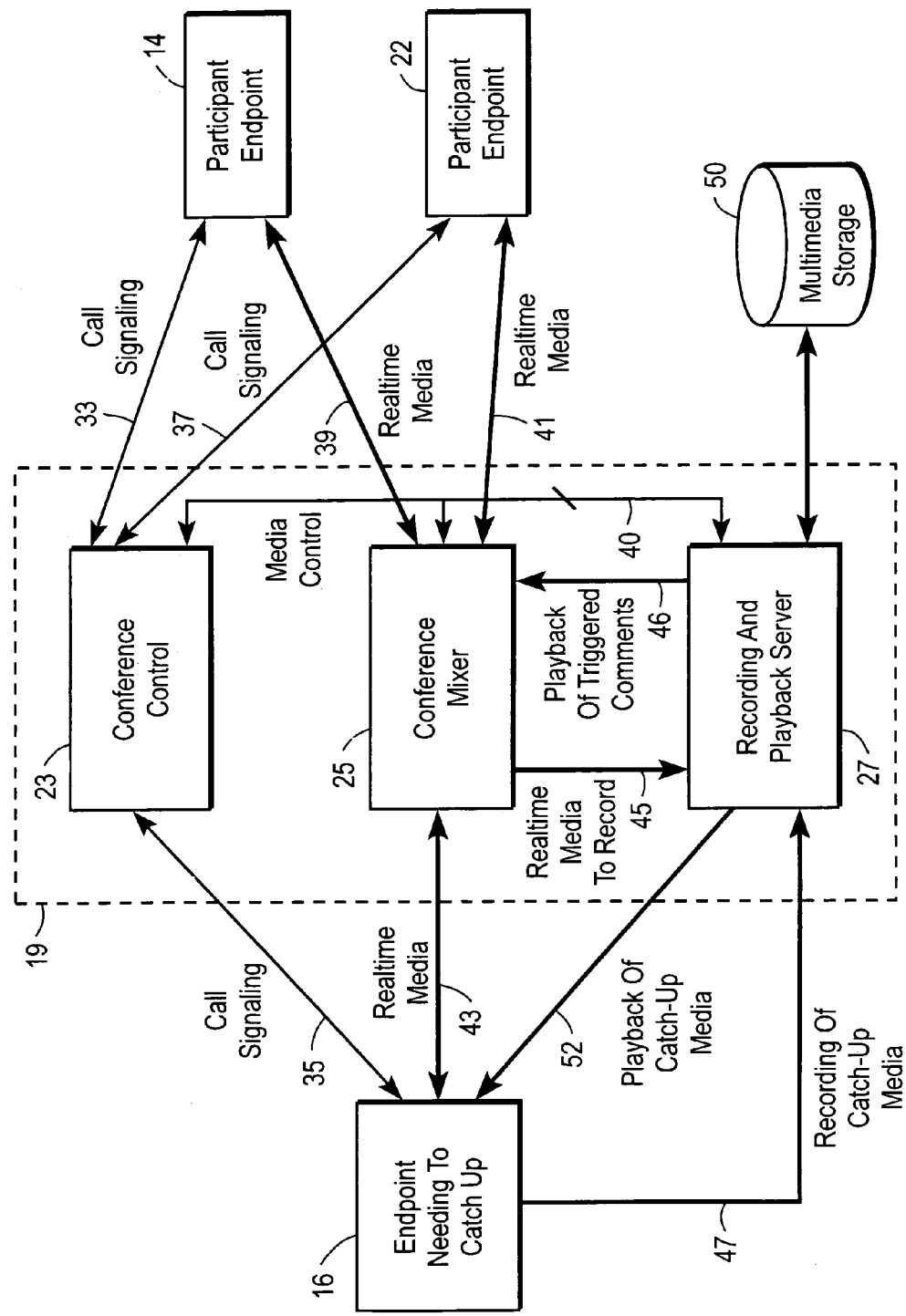
FIG. 2 illustrates an example of endpoint catch-up in the conferencing system shown in FIG. 1.

FIG. 2 illustrates an example of endpoint catch-up in the conferencing system shown in FIG. 1. In the example shown, participant 18 associated with endpoint device (e.g., PC) 18 has stepped away from the conference session for a period of time and needs to catch up to the real-time conference that continues to proceed. This is achieved through conference control unit 23, conference mixer 25, and recording and playback server 27 components of system 19. In operation, conference control 23 is a logical unit that provides media control (shown by path 40) of conference mixer 25 and recording and playback server 27. Conference control unit 23 also performs all of the control plane functions involving endpoints 14, 16 and 22 via call signaling connections 33, 35, and 37, respectively. For instance, conference control unit 23 establishes communication channels for data packets transmitted between endpoints 16, 14 and 22.

Conference mixer 25 mixes or switches the data (audio, video, and/or web collaboration) packet streams and also sends real-time media for recording (via path 45) to server 27. As will be described in more detail below, server 27 may also transmit media playback of triggered comments to mixer 25 on request via connection path 46. As participants talk during a conference, real-time media data transmissions occur via paths 39, 41 and 43 between conference mixer 25 and respective endpoints 14, 22 and 16. Conference mixer 25 mixes the real-time media according to control signals/messages provided by conference control unit 23. For instance, conference mixer 25 may be directed to apply any one of a wide variety of audio/video mixing or switching algorithms to produce an output media stream delivered to the endpoints devices.

Note that in certain embodiments, conference mixer 25 may filter out annoyances by dynamically suppressing audio streams that meet predefined annoyance criteria (e.g., white noise, pink noise, snoring, etc.). It is appreciated that for non-verbal audience reaction, the audio mix can be of relatively low-fidelity. However, for applications where verbal reaction is not to be filtered out as an annoyance, the verbal audience reaction should be of relatively high-fidelity.

Participant 18 may drop out of the real-time conference session by entering a command (e.g., pause button) on endpoint 16. In response, recording and playback server 27 begins recording real-time media (via path 45) from the conference session. Assume, for example, that during the session participant 18 may have a question or a comment for moderator/lecturer 11, with the moderator requesting that all questions be held until the end of the lecture. Participant 18 may click on an icon button of a user interface running on endpoint 16 to signal that he is dropping out of real-time listening mode to record his question/comment. Concurrently, server 27 begins recording the real-time media occurring in lecture hall 12 while endpoint 16 records his question/comment. That is, recording and playback server 27 may also record the question/comment received from endpoint 16 simultaneous with the recording of the real-time media.

Alternatively, detection of speech by the conferencing system may cause the participant to automatically drop out of real-time listening mode and into recording mode. That is, audible speech of a participant who otherwise would not be able to participate directly in the conference may trigger recording of that speech. When the speech stops for a predetermined period (e.g., 5 seconds of silence), the system may automatically stop the recording and enter catch-up mode for that participant.

In a specific implementation, recording and playback server 27 may also automatically record a predetermined time period (e.g., 5-10 seconds) of the conference session just prior to the point in time when endpoint 16 dropped out of the conference and attach it to his recorded question/comment. This additional recording provides a context for the recorded question/comment. The recorded speech and the recorded real-time media may be stored in a multimedia storage unit 50. The combination of the context media and the question/comment may be placed in a moderated question and answer queue, allowing the lecturer to subsequently manage or trigger individual questions or comments.

When participant 18 has finished recording his question/comment (indicated by an appropriate command entered on endpoint 16), server 27 starts transmitting playback of the catch-up media recording (shown by path 52) to endpoint 16. The catch-up media is played back at a faster rate (e.g., 1.5×-2× with pauses and silences removed or reduced) than real-time until endpoint 16 catches up to the real-time conference session. Later, after the lecture portion of the conference has ended and the moderator is ready to respond to questions/comments, server 27 retrieves the triggered questions/comments from multimedia storage 50. The questions/comments are played back to conference mixer 25 and transmitted to each of endpoints 16, 14 and 22. Note that the additional 5-10 seconds of recorded media preceding the question/comment may help the listeners to understand and identify the context of the question/comment.

Figure 3:
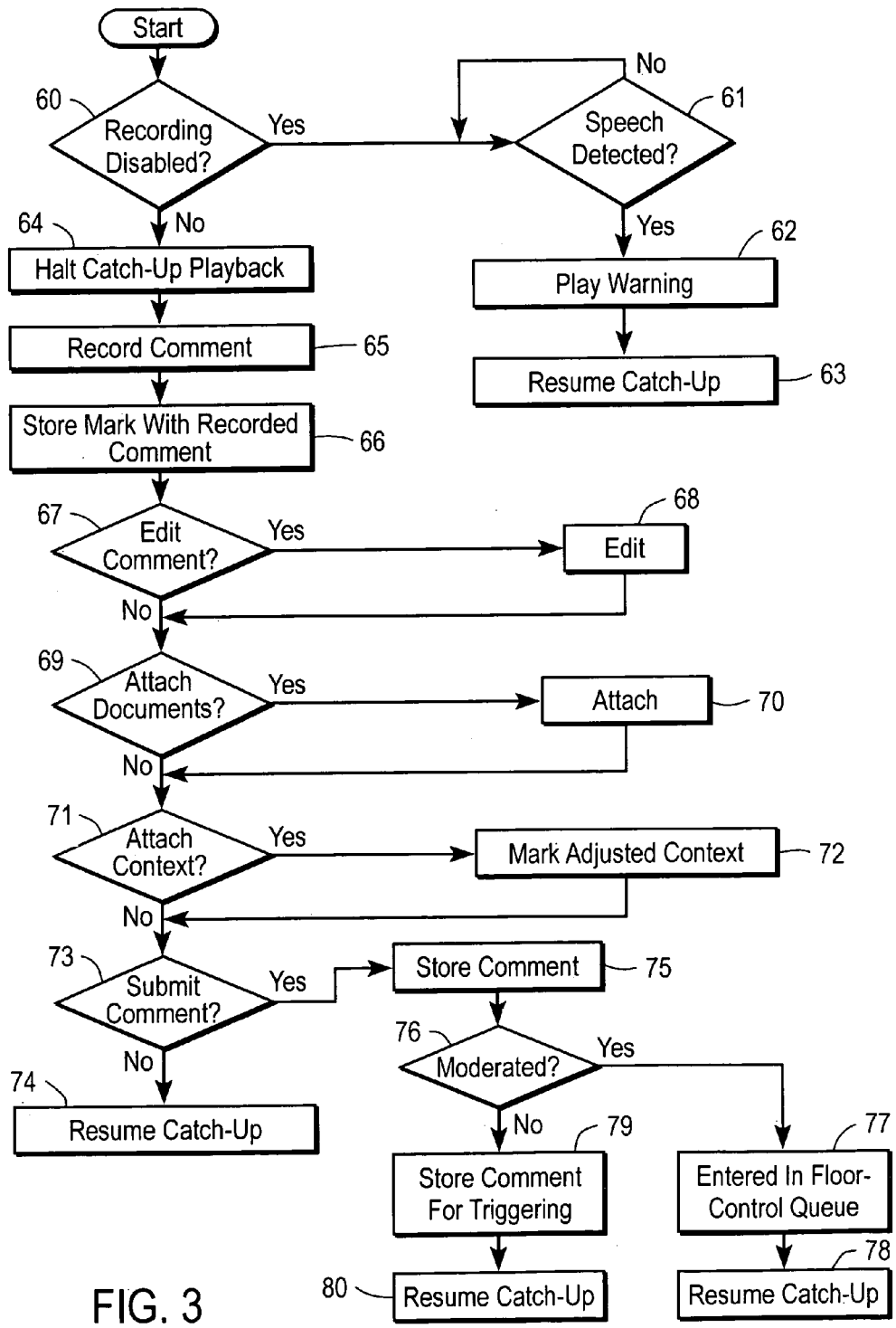
FIG. 3 illustrates an example method of handling speech during catch-up mode.

FIG. 3 illustrates an example method of handling speech during catch-up mode. When speech is detected by the system in catch-up mode—such as when the listener interjects a question or comment—the conferencing system may first query whether the recording feature is disabled (block 60). If it is, then when speech is detected (block 61) the system may play a warning to the user (block 62), after which time playback of catch-up media resumes (block 63). The warning may be an audible tone or an IVR notice stating that recording of speech is currently disabled. On the other hand, if the recording feature is enabled, then playback of catch-up media is temporarily halted (block 64). The participant's comments are recorded (block 65) and a temporal mark is stored along with the recorded comments (block 66) indicating the context or point in the conference session where the participant's question/comment arose. The mark may be a simple indicator stating the comment occurred at "time 24:47" of the conference.

After the question/comment has been recorded, the system may optionally prompt the participant as to whether he wishes to edit the recording (block 67). If so, then the participant may edit his comments by recording over his previous comments (block 68). Other optional prompts may include the system asking whether the participant wants to attach any documents such as charts, diagrams, pictures, etc., (blocks 69 & 70); or whether the participant wants to adjust the marked context point (blocks 71 & 72), e.g., by changing the time mark when the comment is triggered in the conference session (for instance, the participant may indicate that he wants twenty seconds of the recorded real-time media played back before his comment).

The system may also give the participant the option of submitting/storing his question/comment (blocks 73 & 75). If the participant declines (e.g., he reconsiders and determines that his comment is unnecessary or does not significantly add to the discussion), the system discards the recorded comment and resumes catch-up playback (block 74). In the case of a submitted question/comment, the system may further query whether the conference is a moderated conference (block 76). For moderated conferences, the comment may be entered into the floor-control queue (block 77); that is, when the floor is opened for questions and/or comments, the comment will be heard by the participants in on ordered manner. Once the comment has been submitted, the system may then resume catch-up playback (78). If the conference is not moderated, the comment may be stored for subsequent triggering (block 79) after which time the system resumes catch-up playback (80).

Figure 4:
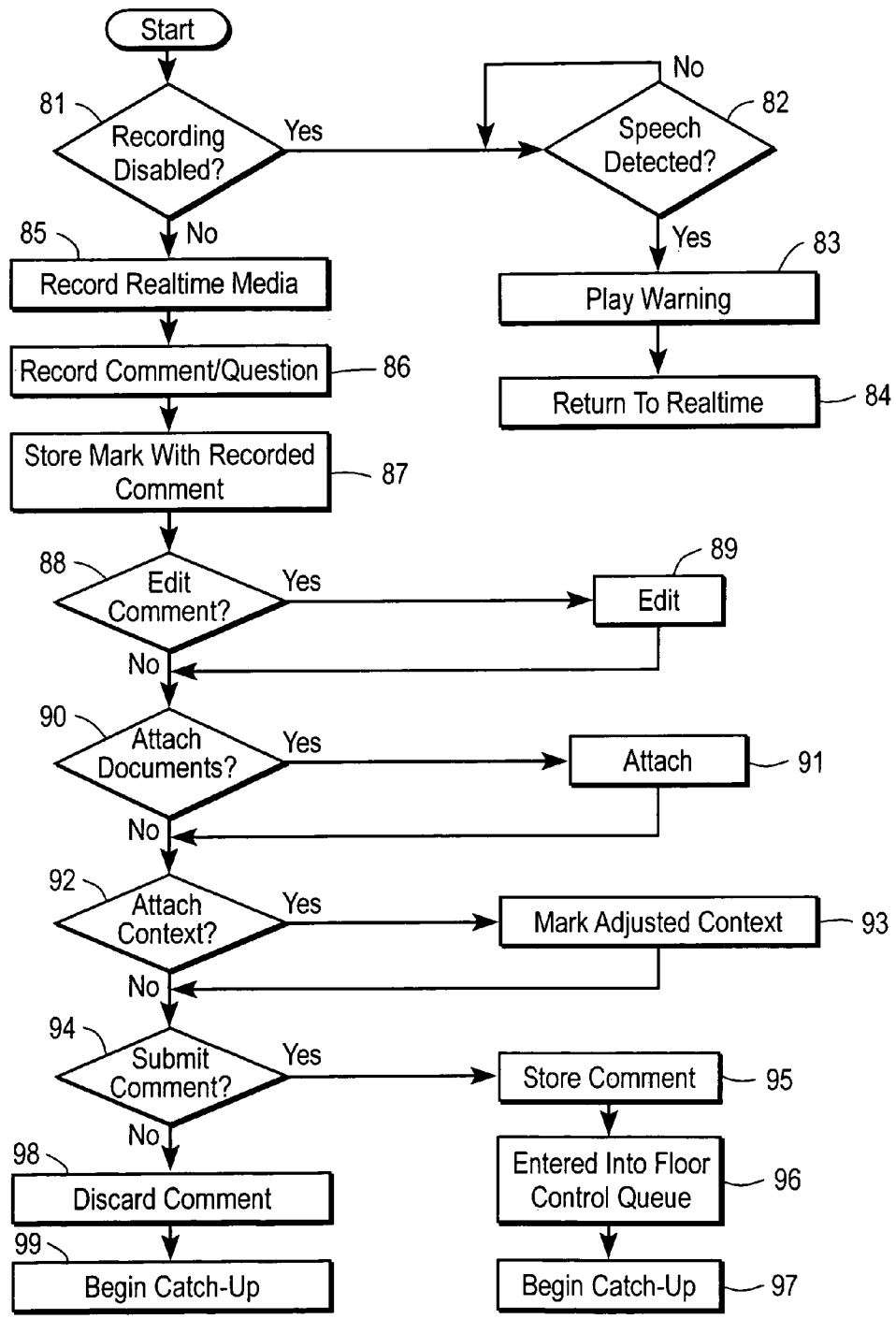
FIG. 4 illustrates an example method of handling speech during a moderated conference.

FIG. 4 illustrates an example method of handling speech during a moderated conference. As in the example of FIG. 3, when speech is detected the system may first query whether the recording feature is disabled (block 81). If so, and speech is detected (block 82) a warning is played to the user (block 83) and the system returns to real-time (block 84). If the recording feature is enabled, the system starts recording the real-time conference session for subsequent catch-up playback (block 85). The participant's comment/question is recorded (block 86) and a mark is stored indicating the context of the comment/question (block 87). In a manner similar to the example of FIG. 3, the system may then optionally prompt the participant to edit the comment (blocks 88 & 89); attach documents (blocks 90 & 91); attach or adjust the context (blocks 92 & 93); and then either submit or discard the comment before beginning the catch-up process (blocks 94-99), i.e., playback of the portion of the conference that occurred while the comment/question was being made or asked.

Figure 5:
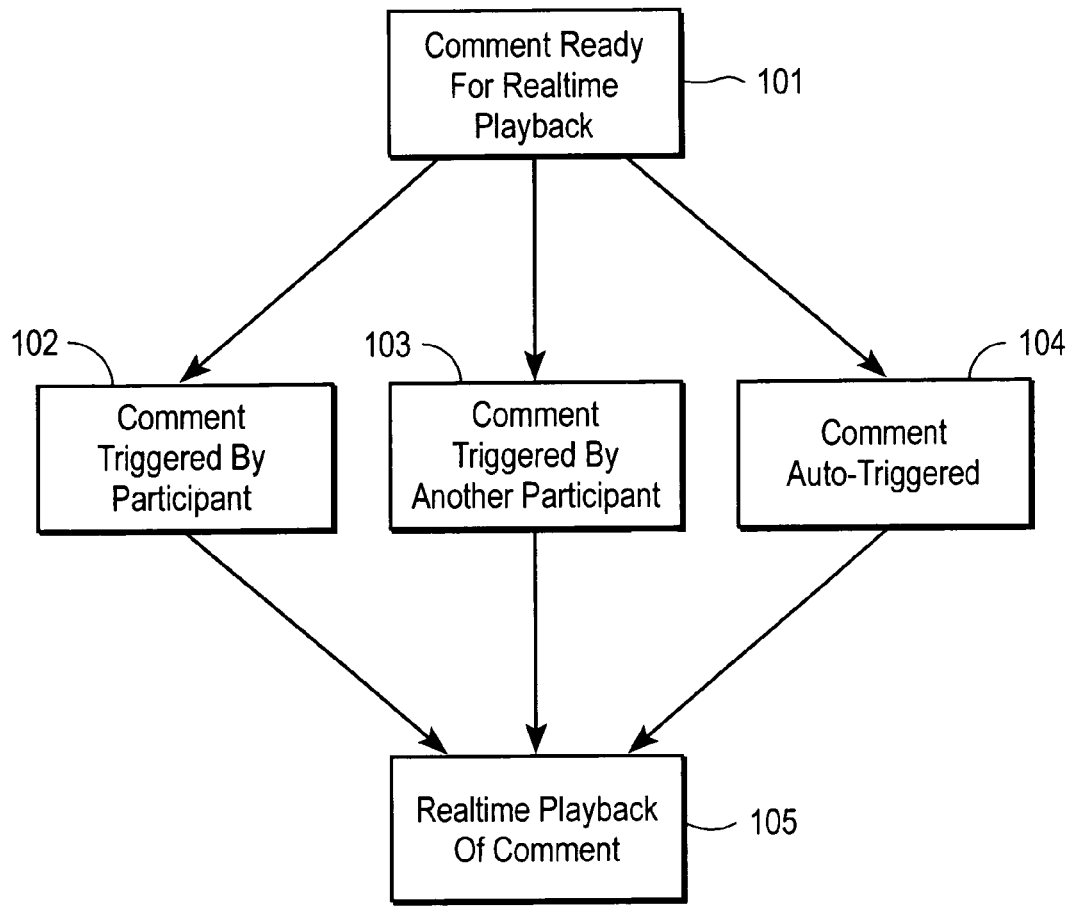
FIG. 5 illustrates an example method for triggering a comment for real-time playback in an open floor conference.

FIG. 5 illustrates an example method for triggering a comment for real-time playback in an open floor conference. When a comment is ready for real-time playback in an open floor conference (block 101) a variety of triggering mechanisms may be used. The comment may be triggered for playback either by the participant who made the comment, e.g., using a command entered via graphical user interface (GUI) or voice user interface (VUI) once the participant has finished catching up (block 102). For example, the participant may have access to a list of comments that he has made (e.g., on a webpage or computer screen), and when there is a pause in the live conference the participant may manually trigger real-time playback of the comment through the GUI or VUI. Alternatively, the comment may be triggered by another participant using the GUI or VUI (block 103). The other participant may see a queue of comments on a computer screen, for instance, and click on a comment to trigger real-time playback of the comment. Yet another alternative is to have the comment auto-triggered by the conferencing system (block 104) when the participant has finished catching up and a period of silence has been detected. The triggered comment is then played back in real-time (block 105).

Figure 6:
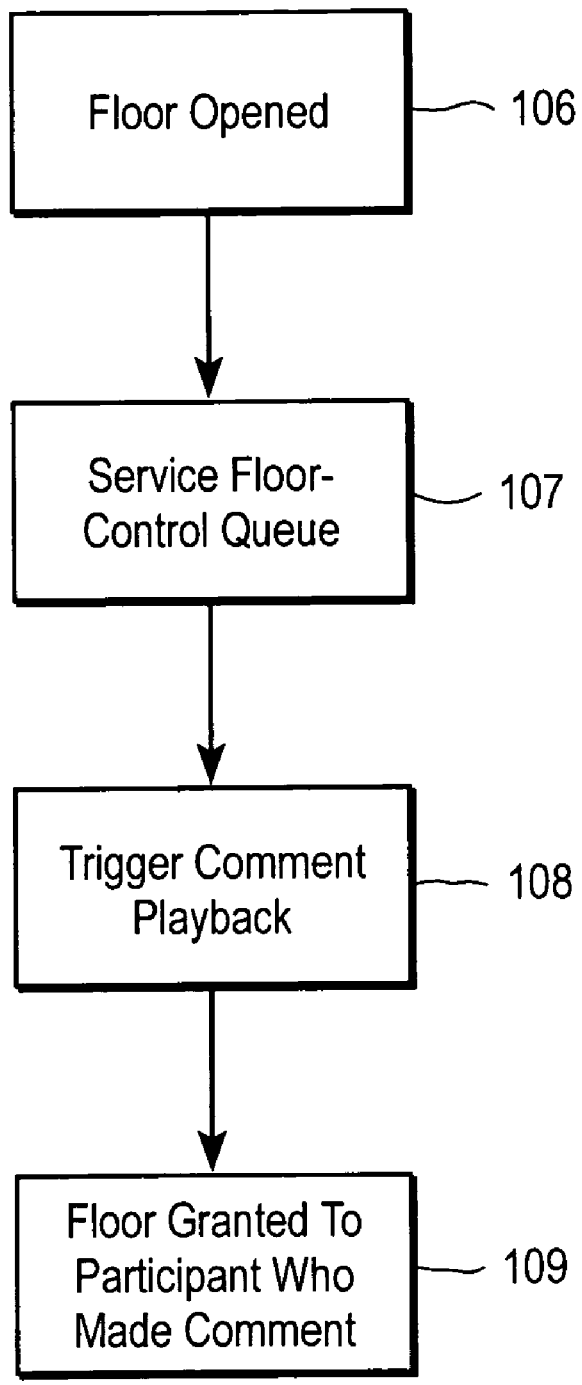
FIG. 6 illustrates an example method for triggering a comment for real-time playback in a moderated conference.

FIG. 6 illustrates an example method for triggering a comment for real-time playback in a moderated conference. In this scenario, the floor is opened for questions at the end of a floor-controlled conference or right before a change of agenda, etc. (block 106). A floor-control queue may be utilized to accumulate questions/comments generated by the participants throughout the conference session. The floor-control queue is then accessed or serviced at an appropriate time following the main presentation or discussion (block 107). When a comment makes it to the top of the queue, its playback is triggered (block 108). Alternatively, playback of a comment may also be triggered by a variety of ordinary floor-control algorithms. For example, comments do not necessarily have to be played back in order generated. In this example, when playback of a comment/question is triggered, the floor is granted to the participant who made the comment or asked the question (block 109). This gives that participant the ability to explain or further amplify on his comment if he wishes.

Figure 7:
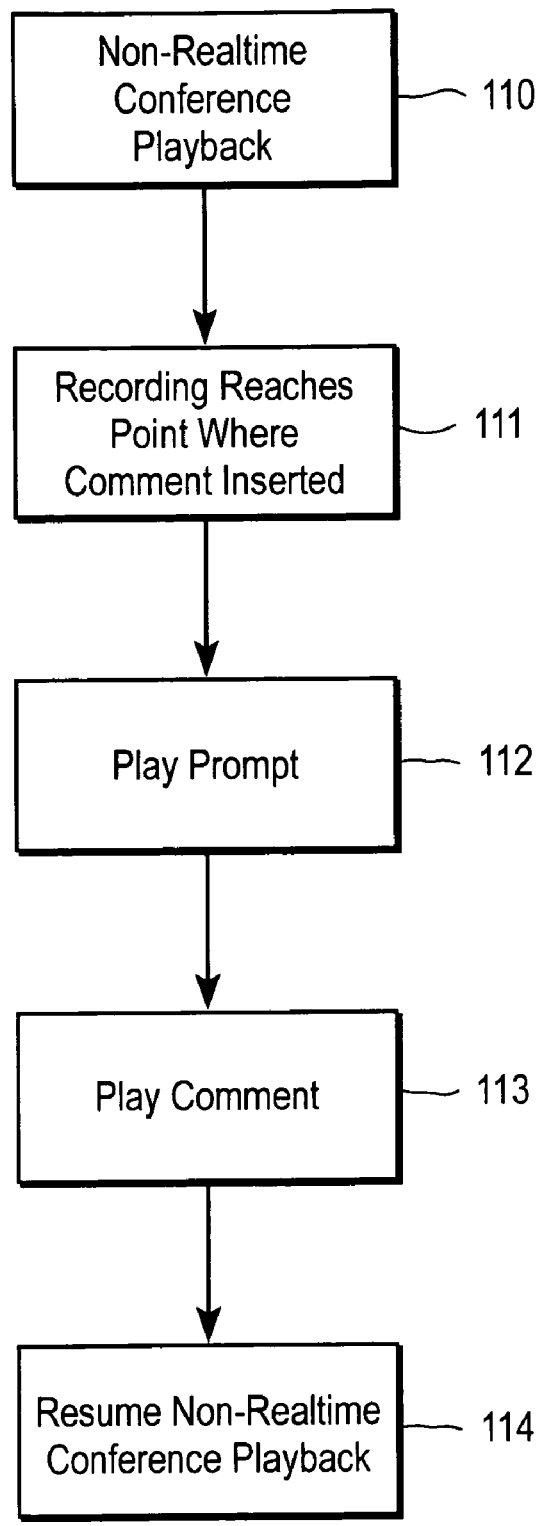
FIG. 7 illustrates an example method for non-real-time playback of a comment in the conferencing system of FIG. 1.

FIG. 7 illustrates an example method for non-real-time playback of an inserted comment when an off-line listener is playing back an entire conference recorded by the conferencing system of FIG. 1. The process in this example begins with a listener (or viewer) receiving a non-real-time playback of the conference session, i.e., a recording (block 110). As the playback progresses, the recording eventually reaches a point where a comment was previously inserted by a participant to the meeting (block 111). The comment need not have been played out in real-time—only that it has become part of the conference session recording. At the point where the comment is inserted, the system may first play a prompt to the listener indicating that the comment which follows was inserted by a non-real-time conference participant (block 112). For example, an IVR may state, "The following comment was made by a participant attending the conference session but was not part of the real time conversation." Once the prompt has been played, the recorded comment is played (block 113). After playback of the comment, the non-real-time conference session may resume (block 114).

Figure 8:
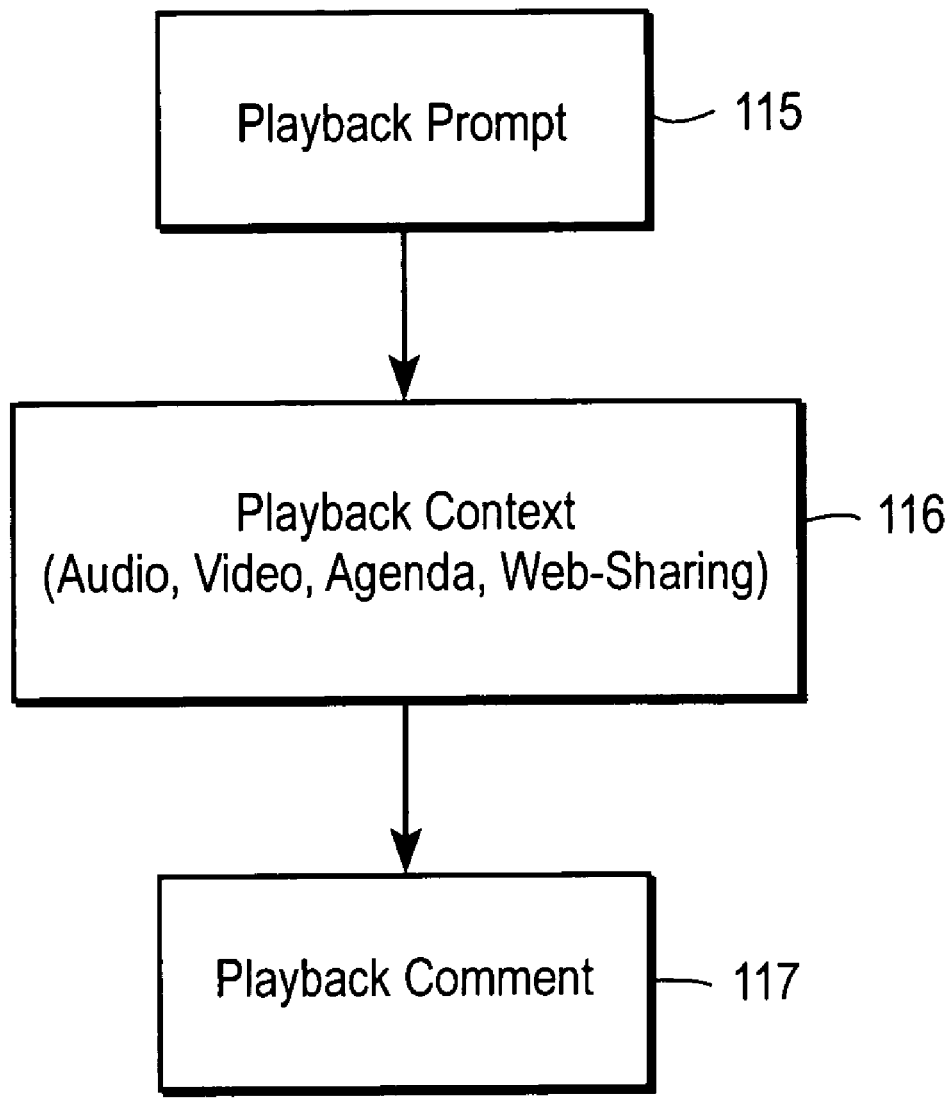
FIG. 8 illustrates an example method for playback of context when a comment is triggered in the conferencing system of FIG. 1.

FIG. 8 illustrates an example method for playback of context when a comment is triggered in the conferencing system of FIG. 1. This example begins with the playing of a prompt or IVR script notifying the listener that a comment is about to be played back (block 115). Prior to playback of the comment itself, a predetermined amount of context is played ahead of where the comment occurred in the course of the conference session (block 116). For example, the context may comprise a preceding portion (e.g., 15 seconds) of the audio recording of the conference session just prior to the point where the comment occurred. In other cases, the context may comprise video, agenda, or web sharing context. The context playback may also comprise multiple different types of media, e.g., audio/video playback.

In a specific implementation, when the context is triggered to pop-up on a participant's web browser, the agenda context may appear (e.g., "the context for this comment is Agendum 53," etc.). If the context involves web sharing, a slide that was used when the comment was made may automatically pop-up on the participant's computer screen. Additionally, an excerpted portion of the audio playback preceding the comment may accompany the information presented graphically on the user's PC monitor screen. After the full context has been played out, the actual comment is then played (block 117).

In certain embodiments, the system may be configured to allow user-controlled marking of context preceding a comment or question. This feature may apply to playback of recorded conferences, playback of catch-up media while the live, moderated conference session continues (i.e., in real-time), or during a real-time moderated conference. A variety of different options may be provided. For instance, in one embodiment a participant might hear something in a real-time conference session, or playback of a recorded session, and want to set a mark at that point using a GUI or VUI. In a specific example, a participant who has already recorded a comment/question may desire to mark a point in the session preceding where his comment/question occurred. In other words, instead of using a default context setting (e.g., 10 seconds of playback preceding the comment), the system may allow the commentator to determine the appropriate context and set the context accordingly. For instance, the commentator may determine that 25 seconds of preceding recording is needed to fully understand his comment. In other cases, the commentator may decide to attach a report, graph, or web link instead of, or in addition to, a selected number of seconds of contextual playback.

User-controlled marking of context may also be provided in the conferencing system of FIG. 1. User-controlled marking may be utilized in a situation where a user is listening to playback of catch-up media while the live, moderated conference session continues (i.e., in real-time). The user may want to control marking of the context preceding a question and/or comment that he has already recorded in the system. In order to do so, the user transitions from real-time to playback mode in the conferencing system. The user may then record his comment and precisely mark the context point preceding the comment using a GUI or VUI. For example, the user may listen to the context preceding his comment and then mark the context point to be where it makes the most sense. Alternatively, the user may simply choose a specified amount of time (e.g., 20 seconds) preceding the comment.

In another example of participant-controlled marking, the user may insert provisional marks while remaining a real time participant in the conference. For example, the participant may be listening to a lecture and begin to hear something that he doesn't understand. If misunderstood point is subsequently clarified, the participant can cancel the provisional mark. However, if the participant then leaves a comment or question, the provisional mark can act as the actual beginning of the context for the question.

It should be understood that elements of the present invention may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, or other type of machine-readable medium suitable for storing electronic instructions.

Additionally, although the present invention has been described in conjunction with specific embodiments, numerous modifications and alterations are well within the scope of the present invention. Accordingly, the specification and drawings are to be regarded in an illustrative rather than a restrictive sense.

I claim:

1. A computer-implemented method for conferencing over a network comprising:
   receiving input at a server indicating that an endpoint associated with a user connected to the server over the network is dropping out of a real-time mode of attending an on-going conference session;
   recording a portion of the on-going conference session beginning at a time point when the endpoint drops out of the real-time mode;
   recording a comment/question received from the endpoint contemporaneous with the recording of the portion of the on-going conference session;
   receiving additional input indicating that the comment/question has ended and the endpoint is ready to resume receiving the on-going conference session;
   playing back the portion of the on-going conference session to the endpoint at an accelerated rate; and
   returning the endpoint to the real-time mode of attending the on-going conference session playback when the portion recorded catches up with the on-going conference session.

2. The computer-implemented method of claim 1 further comprising storing the comment/question in a storage unit.

3. The computer-implemented method of claim 1 further comprising detecting the comment/question.

4. The computer-implemented method of claim 3 wherein the comment/question comprises the speech of the user.

5. The computer-implemented method of claim 1 wherein the on-going conference is a moderated conference and further comprising inserting the stored comment/question as a floor control request to the moderated conference.

6. The computer-implemented method of claim 1 further comprising storing a mark indicative of a point in the on-going conference session just prior to the comment/question.

7. The computer-implemented method of claim 6 further comprising adjusting the mark to set a context for the comment/question.

8. The computer-implemented method of claim 1 further comprising providing a reminder to the endpoint that the comment/question is not being sent to the on-going conference in real-time.

9. A computer-implemented method for conferencing over a network comprising:
   sending, by a mixer, a real-time media stream of an on-going conference session to an endpoint associated with a user;
   detecting, by a server, speech of the user transmitted from the endpoint, the speech comprising a comment/question that pertains to content of the on-going conference session;
   recording the speech;
   recording the real-time media stream beginning at a first point in time when the speech is detected;
   storing the speech; and
   playing back the recorded real-time media stream to the endpoint at an accelerated rate relative to the on-going conference session after the speech has ended; and
   resuming sending of the real-time media stream at a second point in time when playback of the recorded real-time media stream catches up to the on-going conference session.

10. The computer-implemented method of claim 9 further comprising attaching a document to the speech.

11. The computer-implemented method of claim 9 further comprising editing the stored speech.

12. The computer-implemented method of claim 9 further comprising entering the stored speech in a floor control queue for subsequent playback.

13. The computer-implemented method of claim 9 further comprising marking a context to be played along with the speech.

14. The computer-implemented method of claim 9 further comprising triggering playback of the speech.

15. The computer-implemented method of claim 9 further comprising:
- detecting, by the server, additional speech from the endpoint during playback of the recorded real-time media stream;
- halting playback of the recorded real-time media stream;
- recording the additional speech;
- recording the real-time media stream beginning at a third point in time when the additional speech is detected;
- storing the additional speech in a storage unit; and
- playing back the recorded real-time media stream from the third point in time to the endpoint at an accelerated rate after the additional speech has ended.

16. A non-transitory computer-readable storage medium encoded with computer instructions, which, when executed by a processor, is operable to:
- send a real-time media stream of an on-going conference session to an endpoint associated with a user;
- record speech of the user sent by the endpoint, the speech including a comment/question;
- record the real-time media stream beginning at a first point in time when the speech is detected;
- store the speech;
- enter the stored speech in a floor control queue for subsequent playback; and
- playback the recorded real-time media stream to the endpoint after the speech has ended.

17. The non-transitory computer-readable storage medium of claim 16 wherein the playback is at an accelerated rate relative to the on-going conference session.

18. The non-transitory computer-readable storage medium of claim 16 wherein execution of the computer instructions is further operable to resume sending the real-time media stream at a second point in time when playback of the recorded real-time media stream catches up to the on-going conference session.

19. The non-transitory computer-readable storage medium of claim 16 wherein execution of the computer instructions is further operable to attach a document to the speech.

20. The non-transitory computer-readable storage medium of claim 16 wherein execution of the computer instructions is further operable to edit the stored speech.

21. The non-transitory computer-readable storage medium of claim 16 wherein execution of the computer instructions is further operable to mark a context to be played along with the speech.

22. The non-transitory computer-readable storage medium of claim 16 wherein execution of the computer instructions is further operable to trigger playback of the speech at a certain point in the on-going conference session.

23. The non-transitory computer-readable storage medium of claim 16 wherein execution of the computer instructions is further operable to:
- detect additional speech from the endpoint during playback of the recorded real-time media stream;
- halt playback of the recorded real-time media stream;
- record the additional speech;
- record the real-time media stream beginning at a third point in time when the additional speech is detected;
- store the additional speech; and
- playback the recorded real-time media stream from the third point in time to the endpoint after the additional speech has ended.

24. A system comprising:
- a conference controller to handle call signaling for a plurality of endpoints participating in a conference session;
- a mixer to mix input real-time media streams received from the endpoints and produce one or more output real-time media streams to be sent to the endpoints;
- a server operable in response to control signals received from the conference controller to:
  - record speech of a user sent to the server by a first endpoint;
  - record an output real-time media stream produced by the mixer for the first endpoint beginning at a first point in time when the speech is detected;
  - store the speech;
  - playback the recorded output real-time media stream to the first endpoint after the speech has ended; and
  - playback the stored speech to the mixer at a future point in time after the speech has ended.

25. The system of claim 24 wherein the speech comprises a comment or question that pertains to content of the on-going conference session.

26. A system comprising:
- a multimedia storage unit; and
- means for handling call signaling for a plurality of endpoints participating in a conference session, and for mixing input real-time media streams received from the endpoints to produce one or more output real-time media streams to be sent to the endpoints, the means further for recording a comment/question received from a first endpoint, recording an output real-time media stream produced by the mixer for the first endpoint beginning at a first point in time when the comment/question is detected, storing the comment/question in the multimedia storage unit, and for playing back the recorded output real-time media stream to the first endpoint after the comment/question has ended, the means also for playing back the stored speech to the mixer at a future point in time after the speech has ended.

* * * * *